United States Patent [19]

Lipman et al.

[11] Patent Number: 4,579,534
[45] Date of Patent: Apr. 1, 1986

[54] MANUALLY INDEXED ADJUSTABLE FOCAL LENGTH PLANETARIUM

[76] Inventors: Abby G. Lipman, 1880 Commonwealth Ave. Apt. 7, Brighton, Mass. 02135; Herbert L. Levin, 215 Fox Hill Rd., Needham, Mass. 02192

[21] Appl. No.: 666,647

[22] Filed: Oct. 31, 1984

[51] Int. Cl.$^4$ ............................................. G09B 27/00
[52] U.S. Cl. ..................................................... 434/286
[58] Field of Search ............... 434/284, 285, 286, 287, 434/289

[56] References Cited

U.S. PATENT DOCUMENTS

| | | | |
|---|---|---|---|
| 1,126,231 | 1/1915 | Kullmer | 434/289 |
| 2,693,130 | 11/1954 | Green | 434/286 |
| 2,763,183 | 9/1956 | Liversidge | 434/286 |
| 3,596,379 | 8/1971 | Faulkner | 434/286 |

FOREIGN PATENT DOCUMENTS

| | | | |
|---|---|---|---|
| 322507 | 7/1920 | Fed. Rep. of Germany | 434/284 |
| 598244 | 9/1925 | France | 434/284 |

Primary Examiner—William H. Grieb
Attorney, Agent, or Firm—Donald W. Meeker

[57] ABSTRACT

A dome surface includes patterned perforations which allow light passing through to form various star constellations on a separate external surface. The dome rests upon a base which houses both a light source and a lens system, which may be adjustable, to control the spread of light. The base also has a compass attached to it for the purpose of orienting the planetarium to the actual direction of "true North." A tap player might also be attached to the base of offer recorded instructions. Above the dome there can be placed an opaque mask which blocks the light coming through most of the dome perforations while allowing light to be projected only through one or several sets of perforations which represent selected star constellations. A support placed under one side of the planetarium base tilts the planetarium to an angle corresponding to the local latitude.

20 Claims, 6 Drawing Figures

U.S. Patent
Apr. 1, 1986
4,579,534
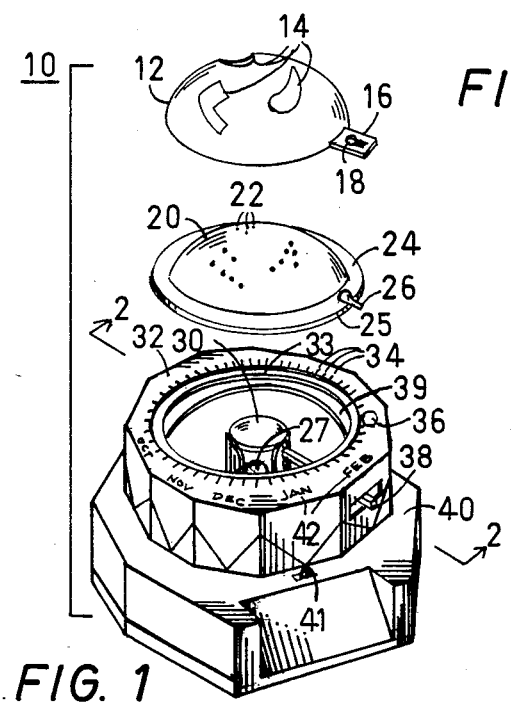
FIG. 1
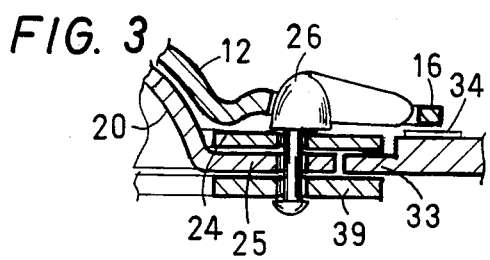
FIG. 3
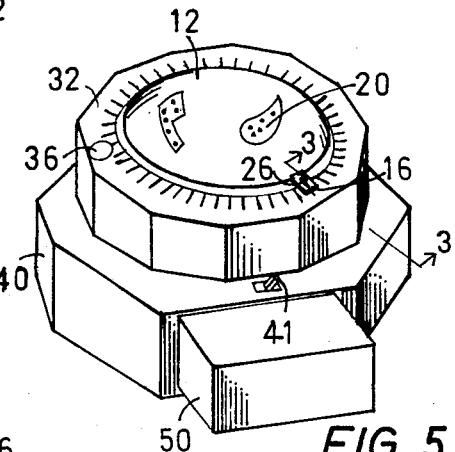
FIG. 4
FIG. 5
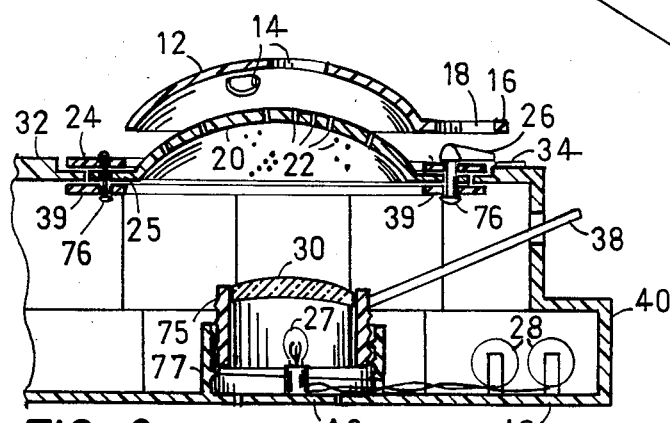
FIG. 2
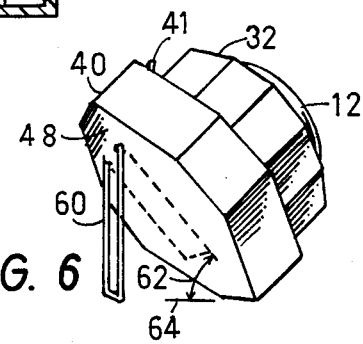
FIG. 6

MANUALLY INDEXED ADJUSTABLE FOCAL LENGTH PLANETARIUM

DESCRIPTION

BACKGROUND OF THE INVENTION

1. Technical Field

My invention relates to celestial learning tools or planetariums and in particular to a small planetarium which is manually adjusted and indexed.

2. Background Art

Most planetariums are very large complex systems requiring motor driving means with single or multiple axes of rotation to simulate apparent changes of the constellations in the sky due to the earth's rotation around the sun.

Many other planetariums require a projecting surface spaced at a specific distance from the light projection source for proper focusing of the celestial configurations.

Other planetariums provide complex systems needed for blinking means or additional light systems for pointing out specific configurations of heavenly bodies in a planetarium display.

DISCLOSURE OF INVENTION

The present invention provides an extremely simple and inexpensive means of displaying the constellations of a hemisphere in proper diurnal positions with a manually operated rotatable dome containing perforations patterned so that projected light through the perforations forms constellation configurations on separate external surfaces. The dome has a protruding combination handle and pointer, and is mounted rotatably on a base provided with a compass for proper orientation. The base is marked with indexed points for the days of the year so as to bring the planetarium orientation of the constellations into alignment with the actual apparent stellar configuration for the day marked by the pointer.

At least one lens mounted between an internal light source and the perforated dome provides control over the spread of light. The focal length of the constellations in the dome may be adjusted by moving the planetarium relative to the external surface or by moving an adjustable lens system to focus the constellations onto a separate external overhead and/or wall surface at a variety of distances from the dome.

Each of a series of masks fits over the dome and is secured thereto by a protruding tab containing a shaped opening, so that it can be secured to the dome indicator tab, causing the mask and dome to rotate together.

Each mask is perforated with at least one shaped opening of a particular configuration to allow the light projections of a single constellation to project therethrough to limit the stellar display and to single out one or more constellations in particular.

A sound recording means attached to the base of the present invention provides the sound instructions for operational and educational information about the constellations projected visually by the planetarium.

A support leg may be placed under one side of the planetarium base to tilt the planetarium relative to a horizontal surface at an angle corresponding to the local latitude.

BRIEF DESCRIPTION OF THE DRAWINGS

These and other details and advantages of my invention will be described in connection with the accompanying drawings which are furnished only by way of illustration and not in limitation of the invention, and in which drawings:

FIG. 1 is an exploded perspective view showing the detached mask and underlying rotatable dome, aligned for mounting on the base;

FIG. 2 is a transverse sectional view of the planetarium taken through 2—2 of FIG. 1 showing the light source, the lens, and the lens casing and focusing lever;

FIG. 3 is a partial sectional view of the dome edge at the point from which the indicator tab protrudes;

FIG. 4 is a partial perspective view of the mask tab;

FIG. 5 is a perspective view of the invention with one of the accompanying masks in place on top of the dome and showing a built-in tape deck;

FIG. 6 is an elevational view showing a support leg tilting the planetarium at an angle to the horizontal corresponding to local longitude.

BEST MODE FOR CARRYING OUT THE INVENTION

In FIG. 1 the dome 20 is a perforated opaque shell and can be of any uniformly curved shape, including a hemisphere. The dome is preferably manufactured from any molded synthetic plastic material. The dome's peripheral edge 25 is slightly flattened so as to permit easy engagement between a top ring 24 and a bottom ring 39 to form a track to engage the base.

As shown in FIG. 3, there is located an indicator tab 26 at one point on the peripheral edge 25 of the dome. The tab can be made of molded or extruded plastic and heat staked to the dome edge protruding above the peripheral edge. The tab extends outwardly beyond the edge for easy manual grasping, and tapers, terminating in a point.

Through the dome shell, there are various perforations 22 which are positioned in configurations to simulate star constellations. The location of these perforations is calculated to coincide with the actual relative location of various celestial configurations. As is well known in the art of astronomy, the position of star systems as viewed from one earth location changes on a predictable, daily basis. Therefore, the position of the perforations on the dome 20 are calculated so that as the dome is rotated by measured degrees, the projections of light through the perforations also rotate, thus simulating the daily appearance of celestial bodies on surfaces exterior to and surrounding the dome.

A light source 27 within the base 40 emits light rays that pass outwardly through a focusing lens 30, and then through the perforations 22. Several focusing lenses might be used. The resulting light emissions form images of the star systems upon any separate exterior surface, such as the ceiling and walls of a room.

In FIGS. 1-3, the dome 20 is slidably supported upon the top support surface 32 of the base 40. This support is accomplished by first positioning inside the base a flat bottom ring 39, of a larger circumference than the circumference of the peripheral edge 25 of the dome. The dome is then placed on top of the bottom ring and the base so that the peripheral edge 25 aligns with and is spaced interiorly of the base edge and rests upon a portion of the bottom ring 39 along the entire circumference of both the edge and the bottom ring. The top ring 24, having the same circumference as the bottom ring 39 is then placed over the peripheral edge and the base, thereby opposing the bottom ring in the same position relative to the peripheral edge 25. The top ring, peripheral edge, and bottom ring can be fastened together by bolts, screws or heat staked plastic pegs 76 extending from and through the top ring to the bottom ring, sandwiching the peripheral edge of the dome therebetween. In this manner, the rings and dome 20 will form a track with the base edge 33 slidably fitting between the rings and will be rotatable on the base edge.

The space between the top and bottom rings which is exteriorly adjacent to the peripheral edge 25 of the dome forms a track or cavity in which the base rim 33 will rotate freely. Thus, the ease with which the dome is manually rotated eliminates the need for any motor driving means.

The base rim 33 of the top support surface 34 is formed by the support surface's circular inner edge. The rim is situated between the top and bottom rings spaced apart from the peripheral edge 25. The rim 33 has a thickness less than the distance between the top and bottom rings, so that the dome track will rotate on the rim.

Extending outwardly from the base rim 33 is a top flat surface upon which are printed or engraved sequential markings 34 which represent days in a yearly calendar. The indicator tab 26 will be selectively positioned opposite one of these markings. When the tab 26 is held and rotated, the connected dome and the perforations therein also rotate. In this manner, the tab's alignment with a selected diurnal marking will result in the projection on a surrounding surface of the corresponding celestial configuration for that particular date. The tab thus serves at least two functions in that it is both a handle for rotating the dome and also a means for indicating which diurnal star configuration is projected for any given day.

In FIG. 2 the base 40 houses a light source 27, such as an incandescent lamp. The light rays will shine against the interior surface of the dome, continuing through the dome at the perforation sites 22. Power for the lamp may be supplied by typical internal means such as batteries 28 depicted in FIG. 2, which in turn are wired to the lamp socket 46. Alternatively, the lamp could of course be connected to a suitable external power source in any well-known manner.

The spread of light through the perforations is controlled by at least one lens 30 situated above the light source 27. The lens could be stationary or attached to the top of a movable lens casing 75. The lens casing is in turn slidably engaged to a lens housing 77. The exterior of the sides of the casing are threaded. This threaded surface adjustably interacts with a matching threaded surface located on the surface of the interior sides of the lens housing. An adjustable lever 38 comprises a shaft which extends from the upper threaded portion on one exterior side of the lens casing, upwardly and outwardly through a slot in the side of the base's top support surface. Lateral movement of the lever in one direction will cause the connected thread surface to rotate in one direction, thereby movably engaging the lens casing 75 vertically in one direction. Movement of the lever in the opposite direction would of course change the vertical direction of the lens casing, thereby adjusting the lens 30 in its position relative to the light source 27. The distances between each thread on all the threaded surfaces is sufficiently large so that a relatively small movement of the lever 38 will cause the lens casing 75 to rise or descend in disproportionately larger degrees. This will permit quick adjustment of light divergence through the lens: the focal length can be adjusted to redefine the "real image" of the star constellations when the ceiling height or shape is changed. With a stationary lens the focal length of the constellation projections may be adjusted by moving the entire planetarium.

A mask 12, is shaped to fit over and subsequently conform to the exterior surface of the dome, as depicted in FIGS. 1 and 5. Each mask preferably comprises a thin shell fabricated from any light weight, opaque material. Alternatively, light-transmissive materials such as various inexpensive plastics could be used if they are first painted with a coating which will not transmit light.

The mask will be provided with at least one patterned opening 14 which conforms in shape and size to one of the constellation configurations on the dome surface to admit through the mask all of the light rays corresponding to stars in the constellation. Many different masks could be interchangeably used, each having only one or more shade openings which correspond to a particular constellation.

Best seen in FIG. 4, protruding from one point on the edge of the mask is located a "mask connecting tab" 16 which will align with the dome indicator tab 26 when the mask's openings coincide with the perforations 22 on the dome. The mask 16 is provided with a mask tab opening 18 having the approximate shape of the perimeter of the indicator tab. Thus, the mask tab will fit over the indicator tab, and the protrusion of the indicator tab through the opening 18 will removably lock the mask to the dome so that both rotate simultaneously when the indicator tab 26 is moved. In this manner, light emissions can be limited to projections of a single constellation onto the separate external surface. The image of the constellation can be further accentuated by adjusting the lens to refocus the light rays through the smaller number of perforations, rather than through the multitude of perforations being utilized when a mask is not in use. When the user desires to emphasize a different star system, he/she can simply remove one mask and replace it with a mask which includes an opening corresponding to that particular star system. Thus third and fourth functions for the dome tab are indicated as an orientation and a locking means for the mask.

A compass 36 or other direction-locating means is affixed at one point on top of the top support surface 32. The compass is preferably situated adjacent and exterior to the diurnal markings 34. As the base is rotated, the compass needle will continue to align itself with magnetic north, and orientation of the needle relative to the underlying compass scale (marked in degrees) will indicate the direction in which the base is pointed. This compass attachment will permit the user to duplicate more exactly the orientation of the simulated stellar display to that of the actual celestial configuration on any given evening. For instance, on a given night, a particular constellation would be located in the sky in a particular orientation, relative to the viewer. The viewer would orient the base so that the compass needle on the planetarium base pointed to the correct "North" indication, and then he/she would rotate the indicator tab so that the tab pointed to the diurnal marking for the date. Thus, the simulated constellation would be projected onto the ceiling in the same orientation that the actual constellation would appear in the sky on that date. After observing the projected celestial display, a viewer could then go outside and easily point out and identify all of the visible star systems. Two night later, when the reference constellation has moved several degrees, the indicator tab can be rotatably shifted to the corresponding diurnal marking, and the true celestial configuration for that night will again be visible on the overhead projecting surface.

A sound recording and playing means 50, such as a cassette recorder, may be attached to the base 40 at one of its external sides. The recorder then plays a tape which provides a lecture on the various stellar displays projected onto the ceiling. The tape would also provide operational directions concerning the use and adjustment of the planetarium. The recorder may be powered by the power source 28, or could be directly connected to a household electrical outlet. The "on/off" switch for the recorded might be incorporated into the on/off switch 41 for the light source, so the activation of the light source will simultaneously activate the cassette recording. Alternatively, the recorder could be provided with a separate on/off switch.

In FIG. 6 an alternate embodiment provides a support 60 or leg to be placed under one side edge of the planetarium base 40 for tilting the planetarium to an angle 62 from the horizontal surface 64 upon which it rests. The angle would correspond to the local latitude so that the projection on the ceiling and wall would coincide exactly with the appearance of the constellations in the sky if the ceiling and wall were removed. Adjustment of the angle 62 for different latitudes may be accomplished by tilting the support angle, providing various length supports or by an adjustable, such as telescoping, support. Leg 60 swivels flat against base 48 (dashed).

Educational value, ease of use, convenient adjustment techniques, and simplicity of fabrication are just some of the features which make this planetarium a very useful instrument for the amateur stargazer.

It is understood that the preceding description is given merely by way of illustration and not in limitation of the invention and that various modifications may be made thereto without departing from the spirit of the invention as claimed.

I claim:

1. A manually operable planetarium comprising:
    a dome surface provided with groupings of perforations patterned so that projected light through said perforations onto separate external surfaces forms configurations resembling the apparent positions of constellations of stars viewed from earth, wherein the dome is provided with engaging means around its circumference;
    and the dome is further provided with a protruding holding means which also acts as a pointing means;
    a base for rotatably securing and supporting the dome thereon, wherein the base comprises a top support surface provided with a circular opening and base engaging means which are complementary to the dome engaging means;
    sequential diurnal markings indicating a day of the year upon which actual constellations in the sky correspond in location and orientation with the constellations which are projected onto separate external surfaces when the pointing means is aligned with a particular marking for said day, said markings being adjacent to said base engaging means;
    and which base further comprises a light source directed toward the dome interior;
    and power means for the light source;
    and means for both controlling the spread of light through perforations in the dome and changing the focal length of the constellations projected as points of light onto separate external surfaces at various distances from the dome.

2. The invention of claim 1 further comprising a compass attached to the top of the base to align the base in the proper direction relative to magnetic north.

3. The invention of claim 1 further comprising at least one nontransparent dome covering means which contains at least one patterned opening therethrough of a particular configuration to admit the light of at least one constellation through the opening, and wherein the covering means includes aligning means which coincide with the dome's pointing means when the proper constellation of the dome is aligned with the matching patterned opening of the covering means, and said aligning means is provided with a shaped opening therethrough; and wherein the dome's engaging means adjoins the shaped opening of the aligning means, so that when the covering means is placed over the dome with the dome pointing means secured within the shaped opening of the aligning means, the proper patterned opening of the covering means is aligned with a matching constellation on the dome, and the connected dome pointer means serves to turn the covering means along with the dome, so that the two are always properly aligned.

4. The invention of claim 1 wherein said dome engaging means comprises a peripheral dome edge which is partially sandwiched between and fastened to both an overlying top ring and an underlying bottom ring.

5. The invention of claim 4 wherein at least one plastic peg extends through the top ring at the dome's peripheral edge, and finally extends through the bottom ring, where said peg is heat-staked, thereby allowing the dome and said top and bottom rings all to rotate simultaneously upon the top support surface of the base.

6. The invention of claim 4 wherein the space between said top and bottom rings and exteriorly adjacent to the dome's peripheral edge forms a continuous cavity around the edge of the dome, said cavity acting as a track which allows the dome to rotate freely on a base rim sitting slidably within the dome track, said base rim being formed by the circular inner edge of the elevated top support surface, and said base rim having a thickness smaller than the distance between the top and bottom rings, and the circumference of the dome's peripheral edge being smaller than the other circumference of the top and bottom rings and larger than the dome edge, to allow the dome edge to rotate freely without contacting the base rim.

7. The invention of claim 1 wherein said holding means comprises a tab member fastened to and extending away from a location on the dome's peripheral edge, said tab being tapered as it extends over the top ring, so that it can be grasped easily for manually rotating the dome.

8. The invention of claim 1 wherein said light-controlling means comprises at least one adjustable lens selectively positioned between the light source and the inner surface of the dome.

9. The invention of claim 8 wherein said adjustable lens is focused by an external adjustment means comprises a shaft connected at one end of a "lens casing" and extending upwardly and outwardly through a slot in the side of the base's top support surface, terminated by a knob portion for easy manual adjustment, said lens casing surface adjustably interacting with a matching threaded base lens housing surface.

10. The invention of claim 2 wherein said compass is located on and affixed to the horizontal portion of the top support surface so that it is clearly visible while the base is being manually oriented.

11. The invention of claim 1 wherein a sound recording and playing means is attached to the base so that instructional sound transmissions can accompany the selected projection of light upon the separate external surface.

12. The invention of claim 11 wherein said sound recording and playing means is powered by the same means that powers said light source.

13. The invention of claim 1 further comprising a support means for elevating one side of the base to form an angle of the planetarium relative to the horizontal surface, which angle corresponds to local latitude.

14. A manually operable indexed planetarium comprising:

an opaque dome surface provided with groupings of perforations patterned so that projected light through said perforations onto separate external surfaces forms configurations resembling the apparent positions of constellations of stars viewed from earth, wherein the dome is provided with a circular peripheral edge provided with a slot therein around the entire circumference, and the dome is further provided with an indicator tab having a pointing means protruding externally at one point on the peripheral edge above the slot, which tab may be grasped for manually rotating the dome;

a base for rotatably securing and supporting the dome thereon, wherein the base comprises an elevated horizontal top support surface provided with a circular opening therein, and around the edge of the circular opening, a matching lip to engage the dome slot rotatably, and adjacent to the matching slot sequential diurnal markings which illustrate constellation positions on any desired day when the dome indicator tab pointing means is aligned with the diurnal markings on the base;

and which base further comprises an enclosed space for housing a light source directed toward the dome interior, and power means for the light source, and between the light source and the dome at least one lens to control the spread of light through the perforations in the dome, and to change the focal length adjustably of the constellations projected as points of light onto external surfaces at various distances from the dome.

15. The invention of claim 14 wherein the base further comprises a compass secured to the top of the base to align the base in the proper direction.

16. The invention of claim 14 wherein a sound recording and playing means is attached to the base so that instructional sound transmissions can accompany the selected projection of light upon the separate external surface.

17. The invention of claim 16 wherein said sound recording and playing means is powered by the same means that powers said light source.

18. The invention of claim 14 further comprising at least one nontransparent dome covering means which contains at least one patterned opening therethrough of a particular configuration to admit the light of at least one constellation through the opening, and wherein the covering means includes aligning means which coincide with the dome's pointing means when the proper constellation of the dome is aligned with the matching patterned opening of the covering means, and said aligning means is provided with a shaped opening therethrough; and wherein the dome's engaging means adjoins the shaped opening of the aligning means, so that when the covering means is placed over the dome with the dome pointing means secured within the shaped opening of the aligning means, the proper patterned opening of the covering means is aligned with a matching constellation on the dome, and the connected dome pointer means serves to turn the covering means along with the dome, so that the two are always properly aligned.

19. The invention of claim 14 further comprising a support means of elevating one side of the base to form an angle of the planetarium relative to a horizontal surface, which angle corresponds to local latitude.

20. The invention of claim 14 wherein said light-controlling means comprises at least one adjustable lens selectively positioned between the light source and the inner surface of the dome.

* * * * *